United States Patent
Kuo et al.

(10) Patent No.: US 9,830,252 B2
(45) Date of Patent: Nov. 28, 2017

(54) SYSTEM, METHOD AND NON-TRANSITORY COMPUTER READABLE MEDIUM FOR SOFTWARE TESTING

(71) Applicant: INSTITUTE FOR INFORMATION INDUSTRY, Taipei (TW)

(72) Inventors: Chien-Ting Kuo, Taichung (TW); Shih-Jen Chen, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 15/047,603

(22) Filed: Feb. 18, 2016

(65) Prior Publication Data
US 2017/0139811 A1    May 18, 2017

(30) Foreign Application Priority Data
Nov. 18, 2015 (TW) .............................. 104138069 A

(51) Int. Cl.
G06F 9/44 (2006.01)
G06F 11/36 (2006.01)

(52) U.S. Cl.
CPC ...... *G06F 11/3664* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 5,671,351 A * | 9/1997 | Wild | ................... | G06F 11/3688 714/38.13 |
| 5,991,537 A * | 11/1999 | McKeon | ................... | G06F 8/71 717/115 |
| 8,387,016 B2 | 2/2013 | Tillmann et al. | | |
| 2004/0255275 A1* | 12/2004 | Czerwonka | ......... | G06F 11/3684 717/124 |
| 2008/0282108 A1* | 11/2008 | Jojic | ....................... | G06F 8/436 714/26 |
| 2011/0224946 A1* | 9/2011 | Brayman | ............ | G06F 11/3419 702/176 |
| 2012/0222013 A1* | 8/2012 | Zheng | ................. | G06F 11/3612 717/125 |
| 2015/0067648 A1* | 3/2015 | Sivanesan | ........... | G06F 11/3684 717/124 |
| 2015/0169432 A1* | 6/2015 | Sinyagin | ............. | G06F 11/3684 717/124 |

\* cited by examiner

Primary Examiner — Lewis A Bullock, Jr.
Assistant Examiner — Tina Huynh
(74) Attorney, Agent, or Firm — CKC & Partners Co., Ltd.

(57) ABSTRACT

A software test method used in a software test system that includes a memory that stores a plurality of computer executable instructions and a processing unit coupled to the memory is provided. The software test method includes the steps outlined below. The processing unit detects input and output parameters of under-test software. The processing unit detects inner operation parameters of the under-test software. The processing unit establishes parameter variance probability of each parameter variances between any two functions included in the under-test software to generate test case including test parameters accordingly. The processing unit transmits test parameters of the test case to the under-test software to perform test.

17 Claims, 4 Drawing Sheets

SYSTEM, METHOD AND NON-TRANSITORY COMPUTER READABLE MEDIUM FOR SOFTWARE TESTING

RELATED APPLICATIONS

This application claims priority to Taiwan Application Serial Number 104138069, filed Nov. 18, 2015, which is herein incorporated by reference.

FIELD

The present disclosure relates to a software test technology, and more particularly to a system, method and non-transitory computer readable medium for software testing.

BACKGROUND

Best practices in the development of quality software call for testing code under development at many points. Tools have been developed to generate test cases automatically. However, some techniques generate the test cases with all the possible parameters, which are not only time-consuming, but also not able to efficiently figure out the problems based on characteristics of different under-test software. Some techniques use random numbers to generate the test cases to perform the test procedure, which are not able to determine whether the generated random numbers are effective values to be tested. Such techniques still do not gain advantage on the aspect of efficiency. Some other techniques use non-deterministic programming method to generate the test cases. However, such techniques are still based on random numbers. The test is not able to be performed efficiently.

Accordingly, what is needed is a system, method and non-transitory computer readable medium for software testing to address the above issues.

SUMMARY

The present disclosure provides a software test system. The software test system includes a memory and a processing unit. The memory is configured to store a plurality of computer executable instructions. The instructions include an input and output detection module, an operation status detection module, an analysis module, a test case generation module and a test module. The input and output detection module is configured to detect a plurality of input and output parameters corresponding to under-test software stored in the memory under a continuous operation state. The operation status detection module is configured to detect a plurality of inner operation parameters corresponding to the under-test software under the continuous operation state. The analysis module is configured to establish a parameter variance probability of each of a plurality of parameter variance combinations between any two of a plurality of functions included in the under-test software by using a probability model according to a value range and a parameter type of the input and output parameters and the inner operation parameters. The test case generation module is configured to generate at least one test case including a plurality of test parameters according to the parameter variance combinations and the parameter variance probability. The test module is configured to transmit the test parameters to the under-test software to perform a test procedure thereon according to the test case. The processing unit is coupled to the memory to execute the instructions.

Another aspect of the present disclosure is to provide a software test method used in a software test system that includes a memory that stores a plurality of computer executable instructions and a processing unit coupled to the memory. The processing unit executes the instructions to perform the software test method. The software test method includes the steps outlined below. A plurality of input and output parameters corresponding to under-test software stored in the memory are detected under a continuous operation state by the processing unit. A plurality of inner operation parameters corresponding to the under-test software are detected under the continuous operation state by the processing unit. A parameter variance probability of each of a plurality of parameter variance combinations between any two of a plurality of functions included in the under-test software is established by the processing unit by using a probability model according to a value range and a parameter type of the input and output parameters and the inner operation parameters. At least one test case including a plurality of test parameters is generated according to the parameter variance combinations and the parameter variance probability by the processing unit. The test parameters are transmitted to the under-test software to perform a test procedure thereon according to the test case by the processing unit.

Yet another aspect of the present disclosure is to provide a non-transitory computer readable medium that stores a computer program including a plurality of computer readable instructions to execute a software test method used in a software test system. The software test system that includes a memory that stores a plurality of computer executable instructions and a processing unit coupled to the memory. The processing unit executes the instructions to perform the software test method. The software test method includes the steps outlined below. A plurality of input and output parameters corresponding to under-test software stored in the memory are detected under a continuous operation state by the processing unit. A plurality of inner operation parameters corresponding to the under-test software are detected under the continuous operation state by the processing unit. A parameter variance probability of each of a plurality of parameter variance combinations between any two of a plurality of functions included in the under-test software is established by the processing unit by using a probability model according to a value range and a parameter type of the input and output parameters and the inner operation parameters. At least one test case including a plurality of test parameters is generated according to the parameter variance combinations and the parameter variance probability by the processing unit. The test parameters are transmitted to the under-test software to perform a test procedure thereon according to the test case by the processing unit.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
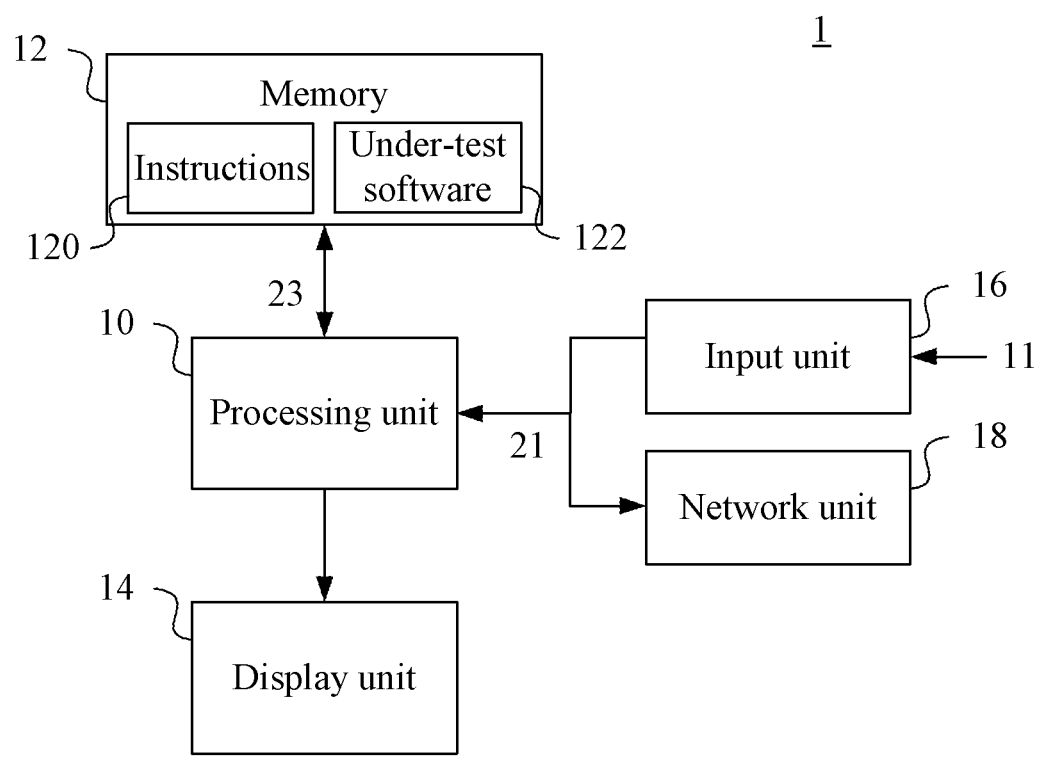
FIG. 1 is a block diagram of a software test system in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is now made to FIG. 1. FIG. 1 is a block diagram of a software test system 1 in an embodiment of the present disclosure. The software test system 1 includes a processing unit 10, a memory 12, a user input and output interface that includes a display unit 14 and an input unit 16 and a network unit 18.

The processing unit 10 is coupled to the memory 12, the display unit 14, the input unit 16 and the network unit 18. The processing unit 10 can be any processor that has the ability to perform data operation. The processing unit 10 performs data transmission with the modules described above by using different types of data transmission paths. In different embodiments, the memory 12 can be such as, but not limited to a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

In an embodiment, the display unit 14 can be such as, but not limited to a liquid crystal display to generate a display frame according to the control of the processing unit 10. In an embodiment, the input unit 16 can be such as, but not limited to a mouse, a keyboard or other devices that can receive a user input 11. The input unit 16 is configured to transmit a command to the processing unit 10 under the operation of a user.

The network unit 18 can be connected to a network (not illustrated), such as but not limited to a local area network or an internet. The processing unit 10 is able to perform communication with other remote hosts through the network by using the network unit 18.

It is appreciated that the components mentioned above are exemplarily described. In other embodiments, the software test system 1 may include other types of components.

The memory 12 is configured to store a plurality of computer executable instructions 120. The instructions 120 operate as a plurality of modules when the instructions 120 are executed by the processing unit 10 to provide the function of the software test system 1. In an embodiment, the processing unit 10 determines whether the software test system 1 is activated by determining whether a user input 11 for activating the software test system 1 is received from the input unit 16. The processing procedure of the operation of the software test system 1 performed by the processing unit 10 is described in the following paragraphs.

Figure 2:
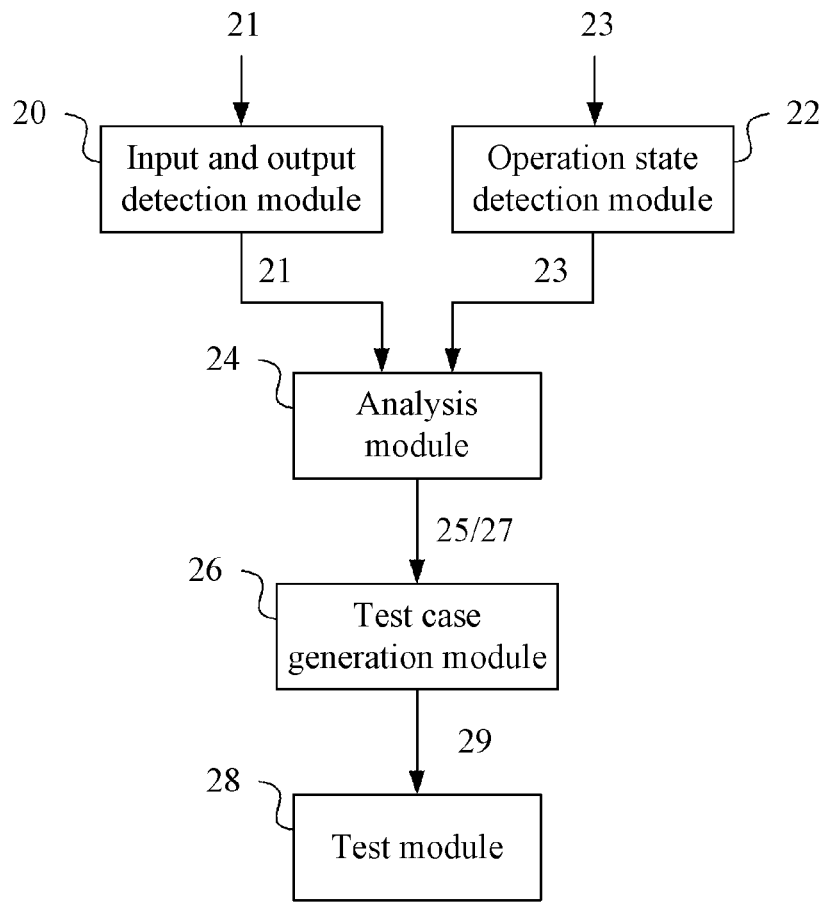
FIG. 2 is a block diagram of the instructions in FIG. 1 executed by the processing unit in an embodiment of the present disclosure.

Reference is now made to FIG. 2. FIG. 2 is a block diagram of the instructions 120 in FIG. 1 executed by the processing unit 10 in an embodiment of the present disclosure. In the present embodiment, the instructions 120 include an input and output detection module 20, an operation status detection module 22, an analysis module 24, a test case generation module 26 and a test module 28.

In an embodiment, the memory 12 illustrated in FIG. 1 can store under-test software 122. The under-test software 122 can be any type of software such as, but not limited to a webpage software, a database software or other kinds of application software. The input and output detection module 20, the operation status detection module 22 and the analysis module 24 can be operated in a training mode to perform detection and analysis of parameters of the under-test software 122. Under such a condition, the user performs normal operations of the under-test software 122 to generate related parameters. The test case generation module 26 generates one or more test cases 29 according to an analysis result. The test module 28 further performs tests on the under-test software 122 according to test parameters included in the test cases 29 under a test mode.

In an embodiment, the processing unit 10 can selectively operate in the training mode and the test mode. In an embodiment, the processing unit 10 determines the content of the user input 11 from the input unit 16 for performing selection to select either the training mode or the test mode.

The detail description of the operation of each of the modules is made in the following paragraphs.

The input and output detection module 20 is configured to detect a plurality of input and output parameters 21 corresponding to under-test software 122 under a continuous operation state.

In an embodiment, the memory 12 in FIG. 1 stores a parser program (not illustrated). The processing unit 10 can perform detection on the application software in operation by executing the parser program and control the display unit 14 to display a frame of related application software list. The processing unit 10 further receives the user input 11 through the input unit 16 from the user to select one of the application software in operation as the under-test software 122 such that the input and output detection module 20 detects the input and output parameters 21 of the under-test software 122.

In an embodiment, the input and output parameters 21 are the parameters inputted or outputted through the network unit 18, the user input and output interface in FIG. 1 or a combination thereof when the under-test software 122 is executed by the processing unit 10. For example, when the under-test software 122 is a webpage software, the input and output parameters 21 may include a remote operation input signal received by the network unit 18 to operate the webpage software, and a response output signal transmitted by the network unit 18.

The operation status detection module 22 is configured to detect a plurality of inner operation parameters 23 corresponding to the under-test software 122 under the continuous operation state. In an embodiment, the under-test software 122 includes a plurality of functions to perform different operations. The inner operation parameters 23 may include such as, but not limited to the memory usage parameters and usage parameters of the functions of the under-test software 122 under the continuous operation state. For example, the memory usage parameters include the used memory address and the amount of the used memory of the under-test software 122 under the continuous operation state. The usage parameters of the functions may include the input and output values of each of the functions.

The analysis module 24 is configured to establish a parameter variance probability 27 of each of a plurality of parameter variance combinations 25 between any two of the functions included in the under-test software 122 by using a probability model according to a value range and a parameter type of the input and output parameters 21 and the inner operation parameters 23.

In an embodiment, the value range is a range of the value of the input and output parameters 21 and the inner operation parameters 23. The parameter type may include such as, but not limited to a Boolean type, a number type, a string type or a combination thereof. The probability model can be a Markov model.

Figure 3:
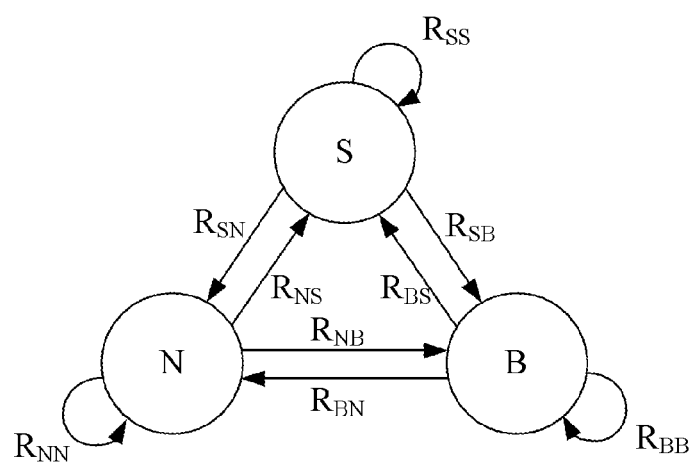
FIG. 3 is a diagram of the relation of the variance probability among three parameter types in an embodiment of the present disclosure.

Reference is now made to FIG. 3. FIG. 3 is a diagram of the relation of the variance probability among three parameter types in an embodiment of the present disclosure. In FIG. 3, the letter B stands for the Boolean type, the letter N stands for the number type and the letter S stands for the string type.

As illustrated in FIG. 3, $R_{NS}$ stands for the probability of the parameters switch from the number type to the string type between such as, but not limited to the input and output of the functions. Similarly, $R_{SN}$ stands for the probability of the parameters switch from the string type to the number type. $R_{NN}$, $R_{SS}$ and $R_{BB}$ stand for the probabilities of the parameters switch from the number type to the number type, from the string type to the string type and from the Boolean type to the Boolean type respectively. $R_{SB}$ and $R_{BS}$ stand for the probabilities of the parameters switch from the string type to the Boolean type and from the Boolean type to the string type respectively. $R_{NB}$ and $R_{BN}$ stand for the probabilities of the parameters switch from the number type to the Boolean type and from the Boolean type to the number type respectively.

By using the Markov model, the probability of a continuous event can be generated to figure out the correlation of the parameters along the operation of the functions. As a result, when the parameter variance combinations 25 are presented in the functions of the under-test software 122, the analysis module 24 can establish the parameter variance probability 27 of each of these parameter variance combinations 25. For example, when the probability of a parameter of a function switching from the number type to the Boolean type is $R_{NB1}$, and the probability of a parameter in a next function switching from the Boolean type to the string type is $R_{BS2}$, the parameter variance probability of the parameters between the two functions becomes the product of $R_{NB1}$ and $R_{BS2}$.

Reference is now made to FIG. 2 again. In an embodiment, the training mode operated by using the input and output detection module 20, the operation status detection module 22 and the analysis module 24 can be controlled by using the input unit 16 to receive the training mode control input for controlling the training mode. Accordingly, the training mode can be terminated, or a time length or a termination condition of the training mode can be set. The termination condition can be such as, but not limited to a condition that a specific function in the under-test software 122 is executed.

The test case generation module 26 is configured to generate one or more test cases 29 according to the parameter variance combinations 25 and the parameter variance probability 27. The test cases 29 include a plurality of test parameters (not illustrated).

In an embodiment, the parameter variance combinations 25 having the higher parameter variance probability 27 are generated under a normal operation mode. On the contrary, the parameter variance combinations 25 having the lower parameter variance probability 27 are the operation mode that may result in exceptional condition. As a result, the test case generation module 26 generates the test parameters in the test cases 29 according to the parameter variance combinations 25 that correspond to the parameter variance probability 27 smaller than a predetermined probability value to test whether abnormal condition occurs when the under-test software 122 is operated under different input and output conditions.

In an embodiment, the processing unit 10 controls the display unit 14 in FIG. 1 to display the input and output parameters 21, the inner operation parameters 23, the parameter variance combinations 25 and the parameter variance probability 27 when the training mode is terminated. The processing unit 10 further receives the user input 11 for adjusting the test cases 29 by using the input unit 16. The test case generation module 26 further adjusts the a weighting ratio of the test parameters and an amount of the test cases 29 according to the test case adjusting input.

In an embodiment, the processing unit 10 operates in the test mode by activating the test module 28 when the test cases 29 are generated after the training mode is terminated or when the test data already exists. The test module 28 is configured to transmit the test parameters to the under-test software 122 to perform a test procedure thereon according to the test case 29.

In an embodiment, the test module 28 performs test on all the functions of the under-test software 122 or only performs test on part of the functions. In an embodiment, when a situation that matches the terminating condition during the test procedure, such as but not limited to a memory error, a software interrupt or the end of the execution of the software, the test module 28 terminates the test and the display unit 14 is controlled to display the test status and the test result. In the practical implementation, the processing unit 10 can store the test result in the memory 12.

In an embodiment, the input and output detection module 20, the operation status detection module 22 and the analysis module 24 can be operated in the test mode as well to collect the parameters of the under-test software 122 during the test procedure and perform analysis thereon. The test case generation module 26 can generate new test cases according to the analysis result.

In an embodiment, the processing unit 10 can determine whether a next procedure of test is performed after the test mode is terminated by determining whether an input to confirm the next test procedure is received by the input unit 16.

Some test techniques generate the test cases with all the possible parameters, which are not only time-consuming, but also not able to efficiently figure out the problems based on characteristics of different under-test software. Some test techniques use random numbers to generate the test cases to perform the test procedure, which are not able to determine whether the generated random numbers are effective values to be tested. Such techniques still do not gain advantage on the aspect of efficiency. Some other test techniques use non-deterministic programming method to generate the test cases. However, such techniques are still based on random numbers. The test cannot be performed efficiently.

As a result, the software test system 1 in the present disclosure establish the probability relation of the input and the output between the functions in the under-test software by using the training mode to further generate the test parameters in the test cases. The abnormal condition that may occur can be figured out efficiently. Not only the time length of the test procedure is decreased, but also the test efficiency is improved.

Figure 4:
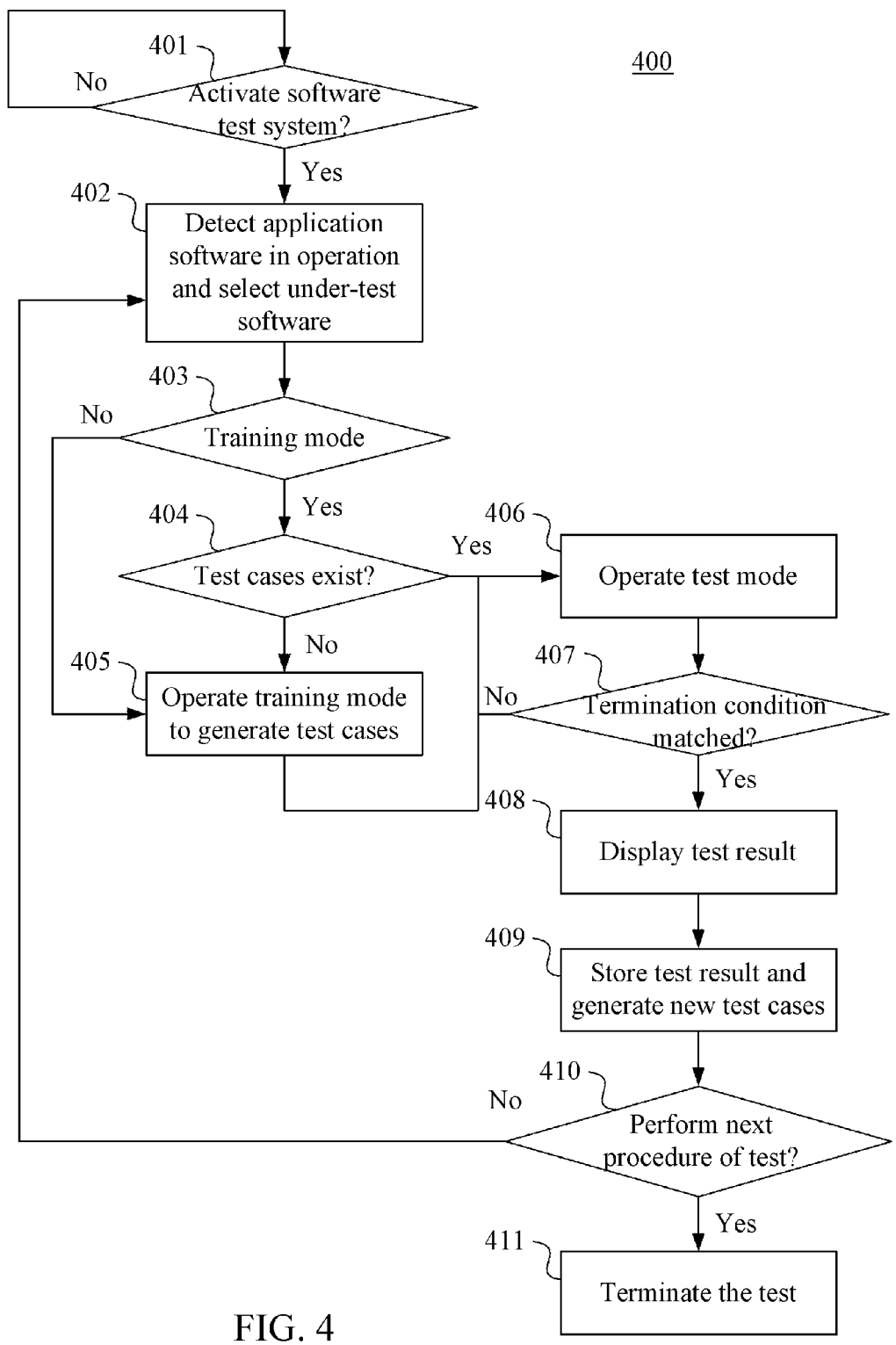
FIG. 4 is a flow chart of a software test method in an embodiment of the present disclosure.

Reference is now made to FIG. 4. FIG. 4 is a flow chart of a software test method 400 in an embodiment of the present disclosure. The software test method 400 can be used in the software test system 1 illustrated in FIG. 1, or be implemented by using other hardware components such as a database, a common processor, a computer, a server, other unique hardware devices that have a specific logic circuit or an equipment having a specific function, e.g. a unique hardware integrated by a computer program and a processor or a chip. More specifically, the software test method 400 is implemented by using a computer program to control the modules in the software test system 1. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

The software test method 400 comprises the steps outlined below. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In operation 401, whether the software test system 1 is activated is determined. In an embodiment, the processing unit 10 determines whether the software test system 1 is by activated determining whether a user input 11 for activating the software test system 1 is received from the input unit 16. When the software test system 1 is not activated, the flow goes back to operation 401 to keep determining.

When the software test system 1 is activated, the flow goes to operation 402 such that the processing unit 10 executes the parser program to detect the application software in operation and receives the user input 11 through the input unit 16 from the user to select one of the application software in operation as the under-test software 122.

In operation 403, whether the training mode is selected is determined. In an embodiment, the processing unit 10 determines the content of the user input 11 from the input unit 16 for performing selection to select either the training mode or the test mode.

When the training mode is not selected, the software test system 1 operates the test mode. In operation 404, whether the test cases exist is determined. In an embodiment, the processing unit 10 determines whether the memory 12 stores the test cases to determine whether the test cases exist.

When the determination result in operation 404 reveals that the test cases do not exist or when the training mode is selected in operation 403, the flow goes to operation 405 such that the processing unit 10 activates the input and output detection module 20, the operation status detection module 22 and the analysis module 24 to operate the training mode to generate the test cases.

After the test cases 29 are generated in operation 405 or the determination result in operation 404 reveals that the test cases exist, the flow goes to operation 406 to operate the test mode.

In operation 407, whether a situation that matches the termination condition occurs is determined, such as but not limited to a memory error, a software interrupt or the end of the execution of the software. When the situations mentioned above do not occur, the flow goes to step 406 to keep operating the test mode. When one of the situations mentioned above occurs, in operation 408, the processing unit 10 controls the display unit 14 to display the test result. Subsequently, in step 409, the processing unit 10 stores the test result in the memory in a practical implementation, and generates new test cases according to the test result.

Further, in operation 410, the processing unit 10 determines whether a next procedure of test is performed. In an embodiment, the processing unit 10 determines whether a next procedure of test is performed by determining whether an input to confirm the next test procedure is received by the input unit 16. When the processing unit 10 determines to perform the next procedure of test, the flow goes back to operation 402 to perform the flow mentioned above. When the processing unit 10 determines not to perform the next procedure of test, the flow goes to operation 411 to terminate the test.

Figure 5:
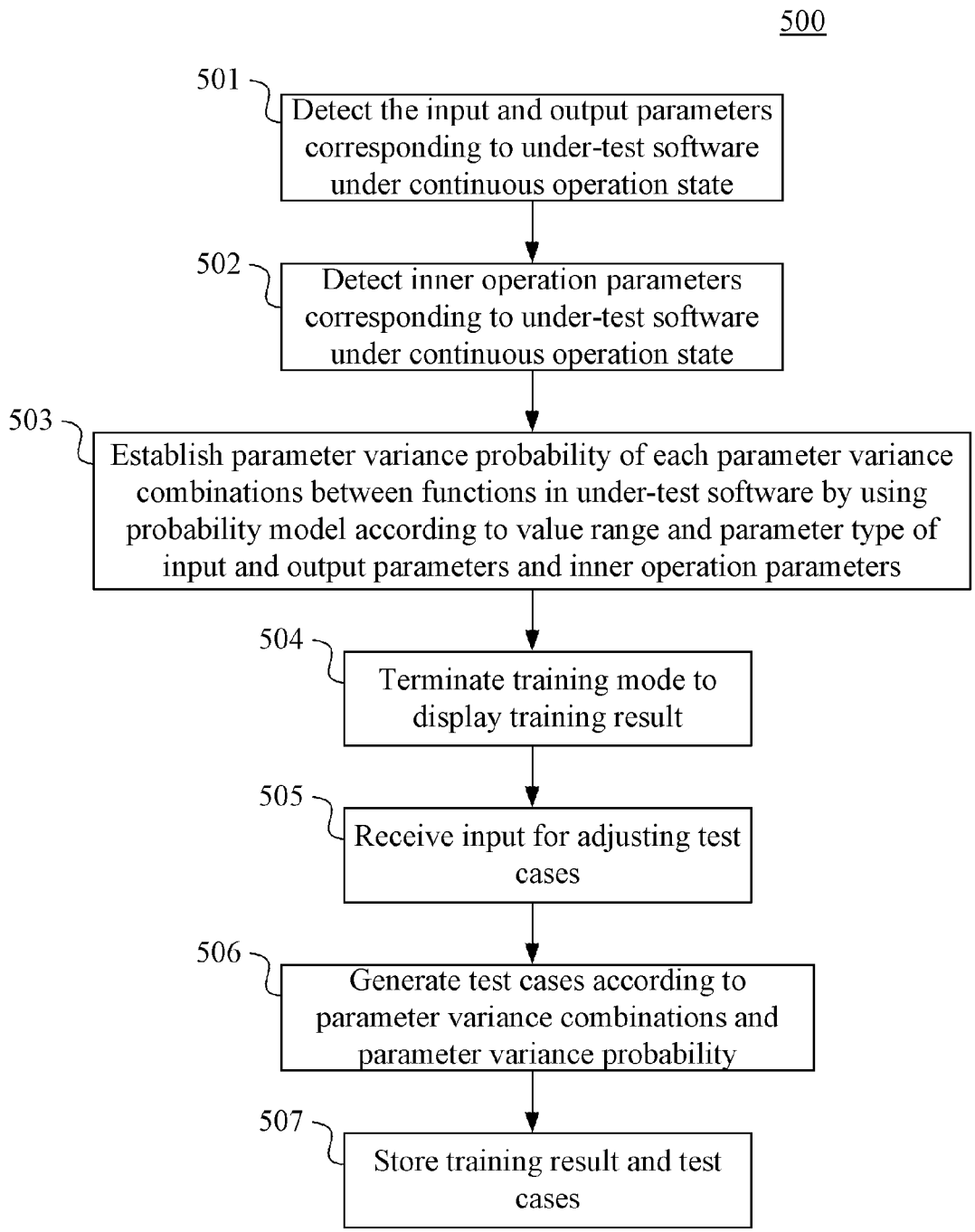
FIG. 5 is a detail flow chart of the method to execute the training mode illustrated in an operation in FIG. 4 in an embodiment of the present disclosure.

Reference is now made to FIG. 5 at the same time. FIG. 5 is a detail flow chart of the method 500 to execute the training mode illustrated in operation 405 in FIG. 4 in an embodiment of the present disclosure.

In operation 501, the processing unit 10 operates the input and output detection module 20 to detect the input and output parameters 21 corresponding to under-test software 122 under a continuous operation state.

In operation 502, the processing unit 10 operates the operation status detection module 22 to detect the inner operation parameters 23 corresponding to the under-test software 122 under the continuous operation state.

In step 503, the processing unit 10 operates the analysis module 24 to establish the parameter variance probability 27 of each of the parameter variance combinations 25 between any two of the functions included in the under-test software 122 by using the probability model according to the value range and the parameter type of the input and output parameters 21 and the inner operation parameters 23.

In operation 504, the training mode is terminated such that the processing unit 10 controls the display unit 16 to display the training result.

In operation 505, the processing unit 10 receives the user input 11 for adjusting the test cases 29 by using the input unit 16 to adjust the a weighting ratio of the test parameters and an amount of the test cases 29. Subsequently, in operation 506, the processing unit 10 operates the test case generation module 26 to generate the test cases 29 according to the parameter variance combinations 25 that correspond to the parameter variance probability 27.

In operation 507, the processing unit 10 stores the training result and the test cases 29 in the memory 12.

It is appreciated that the steps are not recited in the sequence in which the steps are performed. That is, unless the sequence of the steps is expressly indicated, the sequence of the steps is interchangeable, and all or part of the steps may be simultaneously, partially simultaneously, or sequentially performed.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A software test system comprising:
   a memory configured to store a plurality of computer executable instructions, wherein the instructions comprise:
      an input and output detection module configured to detect a plurality of input and output parameters corresponding to under-test software stored in the memory under a continuous operation state;
      an operation status detection module configured to detect a plurality of inner operation parameters corresponding to the under-test software under the continuous operation state;
      an analysis module configured to establish a parameter variance probability of each of a plurality of parameter variance combinations between any two of a plurality of functions comprised in the under-test software by using a probability model according to a value range and a parameter type of the input and output parameters and the inner operation parameters, wherein each of the parameter variance combinations comprises probability of input and output parameters switch from a first parameter type to a second parameter type;
      a test case generation module configured to generate at least one test case comprising a plurality of test parameters according to the parameter variance combinations and the parameter variance probability, wherein the test case generation module generates the test parameters according to the parameter variance combinations that correspond to the parameter variance probability smaller than a predetermine probability value;
      a test module configured to perform the test case using the generated test parameters; and
      a processing unit coupled to the memory to execute the instructions.

2. The software test system of claim 1, wherein the probability model is a Markov model.

3. The software test system of claim 1, wherein the input and output parameters are inputted or outputted through a network unit, a user input and output interface or a combination thereof when the processing unit executes the under-test software.

4. The software test system of claim 1, wherein the inner operation parameters comprise a plurality of memory usage parameters and a plurality of usage parameters of the functions of the under-test software under the continuous operation state.

5. The software test system of claim 1, wherein the parameter type comprises a Boolean type, a number type, a string type or a combination thereof.

6. The software test system of claim 1, wherein the input and output detection module, the operation status detection module and the analysis module are operated in a training mode before the test module performs the test case or in a test mode when the test module performs the test case.

7. The software test system of claim 6, further comprises a user input and output interface comprising an input unit configured to receive a training mode control input such that the processing unit terminates the training mode or set a time length or a termination condition of the training mode according to the training mode control input.

8. The software test system of claim 7, wherein the user input and output interface further comprises a display unit configured to display the input and output parameters, the inner operation parameters, the parameter variance combinations and the parameter variance probability when the training mode is terminated, such that the user input and output interface receives a test case adjusting input by using the input unit, and the test case generation module adjusts a weighting ratio of the test parameters and an amount of the test case according to the test case adjusting input.

9. A software test method used in a software test system that comprises a memory that stores a plurality of computer executable instructions and a processing unit coupled to the memory, wherein the processing unit executes the instructions to perform the software test method, the software test method comprises:
   detecting a plurality of input and output parameters corresponding to under-test software stored in the memory under a continuous operation state by the processing unit;
   detecting a plurality of inner operation parameters corresponding to the under-test software under the continuous operation state by the processing unit;
   establishing a parameter variance probability of each of a plurality of parameter variance combinations between any two of a plurality of functions comprised in the under-test software by the processing unit by using a probability model according to a value range and a parameter type of the input and output parameters and the inner operation parameters, wherein each of the parameter variance combinations comprises probability of input and output parameters switch from a first parameter type to a second parameter type;
   generating at least one test case comprising a plurality of test parameters according to the parameter variance combinations and the parameter variance probability by the processing unit, wherein the test parameters are generated according to the parameter variance combinations that correspond to the parameter variance probability smaller than a predetermine probability value; and
   performing the test case using the generated test parameters by the processing unit.

10. The software test method of claim 9, wherein the probability model is a Markov model.

11. The software test method of claim 9, wherein the input and output parameters are inputted or outputted through a network unit, a user input and output interface or a combination thereof when the processing unit executes the under-test software.

12. The software test method of claim 9, wherein the inner operation parameters comprise a plurality of memory usage parameters and a plurality of usage parameters of the functions of the under-test software under the continuous operation state.

13. The software test method of claim 9, wherein the parameter type comprises a Boolean type, a number type, a string type or a combination thereof.

14. The software test method of claim 9, wherein the steps of detecting the input and output parameters, detecting the inner operation parameters and establishing the parameter variance probability by the processing unit are performed in a training mode before the test case is performed or in a test mode when the test case is performed.

15. The software test method of claim 14, further comprising receiving a training mode control input through an input unit by the processing unit such that the processing unit terminates the training mode or set a time length or a termination condition of the training mode according to the training mode control input.

16. The software test method of claim 15, further comprising:
   displaying the input and output parameters, the inner operation parameters, the parameter variance combinations and the parameter variance probability when the training mode is terminated by a display unit under the control of the processing unit;
   receiving a test case adjusting input by the processing unit by using the input unit; and
   adjusting a weighting ratio of the test parameters and an amount of the test case according to the test case adjusting input by the processing unit.

17. A non-transitory computer readable medium that stores a computer program comprising a plurality of computer readable instructions to perform a software test method used in a software test system, the software test system comprises a memory that stores the instructions and a processing unit coupled to the memory, wherein the processing unit executes the instructions to perform the software test method, the software test method comprises:
   detecting a plurality of input and output parameters corresponding to under-test software stored in the memory under a continuous operation state by the processing unit;
   detecting a plurality of inner operation parameters corresponding to the under-test software under the continuous operation state by the processing unit;
   establishing a parameter variance probability of each of a plurality of parameter variance combinations between any two of a plurality of functions comprised in the under-test software by the processing unit by using a probability model according to a value range and a parameter type of the input and output parameters and the inner operation parameters, wherein each of the parameter variance combinations comprises probability of input and output parameters switch from a first parameter type to a second parameter type;
   generating at least one test case comprising a plurality of test parameters according to the parameter variance combinations and the parameter variance probability by the processing unit, wherein the test parameters are generated according to the parameter variance combinations that correspond to the parameter variance probability smaller than a predetermine probability value; and
   performing the test case using the generated test parameters by the processing unit.

* * * * *